United States Patent
Halfant

(10) Patent No.: US 7,194,189 B2
(45) Date of Patent: Mar. 20, 2007

(54) METHODS AND APPARATUS FOR SMOOTH REVERSE PLAYBACK OF MPEG ENCODED MEDIA

(75) Inventor: Matthew D. Halfant, San Jose, CA (US)

(73) Assignee: Genesis Microchip Inc., Alviso, CA (US)

( * ) Notice: Subject to any disclaimer, the term of this patent is extended or adjusted under 35 U.S.C. 154(b) by 198 days.

(21) Appl. No.: 10/925,092

(22) Filed: Aug. 23, 2004

(65) Prior Publication Data

US 2005/0025456 A1 Feb. 3, 2005

Related U.S. Application Data

(63) Continuation of application No. 09/714,863, filed on Nov. 16, 2000, now Pat. No. 6,801,710.

(51) Int. Cl.
*H04N 5/91* (2006.01)
*H04N 5/85* (2006.01)

(52) U.S. Cl. .......................... 386/68; 386/125

(58) Field of Classification Search ................ 386/68, 386/67, 69, 70, 125, 126, 6, 7, 109, 111, 112, 386/27, 33, 124; *H04N 5/91, 5/85*
See application file for complete search history.

(56) References Cited

U.S. PATENT DOCUMENTS 5,377,051 A * 12/1994 Lane et al. .............. 386/81
5,923,811 A 7/1999 Kawamura et al.
6,353,700 B1 3/2002 Zhou
6,751,400 B1 6/2004 Matsumura et al.
2004/0067043 A1 * 4/2004 Duruoz et al. ............ 386/68

* cited by examiner

*Primary Examiner*—Robert Chevalier
(74) *Attorney, Agent, or Firm*—Beyer Weaver & Thomas, LLP

(57) ABSTRACT

A method and an apparatus for performing the method of decoding and playing in reverse MPEG encoded content. The MPEG encoded content comprises a plurality of pictures frames. The picture frames are comprised of one or more picture frame types selected from the group of picture frame types including I-frames, P-frames, and B-frames. The method and the apparatus for performing the method comprise the steps of obtaining a group of MPEG picture frames ("GOP"), determining the total number of picture frames in the GOP, and setting an index value equal to the total number of picture frames in the GOP. Next, a picture frame F that has a display order equal to the index value is decoded and displayed, and the earliest B-frame that depends upon frame F is determined. All the B-frames that depend upon frame F are decoded and displayed from highest display order to lowest display order, and the index value then is set to a value equal to one less than the display order of the earliest B-frame that depends upon frame F. The process then repeats by obtaining, decoding and displaying the next frame F having a display order equal to the index value, and decoding and displaying the B-frames that depend upon the frame F.

20 Claims, 2 Drawing Sheets

METHODS AND APPARATUS FOR SMOOTH REVERSE PLAYBACK OF MPEG ENCODED MEDIA

CROSS REFERENCE TO RELATED APPLICATIONS

This application is a continuation of application Ser. No. 09/714,863, filed Nov. 16, 2000, now U.S. Pat. No. 6,801,710 from which priority under 35 U.S.C. §120 is claimed, and which is incorporated herein in its entirety.

BACKGROUND OF THE INVENTION

The present invention relates generally to methods and apparatus for reverse playback of MPEG encoded media, and more particularly to a novel method and systems for performing the method that allows for the smooth reverse playback of MPEG encoded media without skipping frames.

MPEG streams are encoded as a series of interdependent frames. There are three basic frame types: I, P, and B. I-frames and P-frames are collectively known as reference frames, because other frames may depend upon them for their reconstruction. B-frames are always dependent, but no frame is in turn dependent upon them. Specifically, the dependency rules are as follows:

- I-frames are completely self contained, and may be decoded without reference to any other frame;
- P-frames are dependent upon the immediately preceding reference frame, which may be an I-frame or another P-frame; and
- B-frames depend upon a pair of reference frames, one immediately preceding it, the other immediately following it, in normal display order.

Because of the dependencies, the MPEG frames typically are presented in a stream having an order slightly different from the output display order. For example, an MPEG stream might begin I1-P2-B3-B4, and would be decoded in the order given. That is because P2 depends upon I1, and both B3 and B4 depend upon both I1 and P2. But the intended display order may be I1-B3-B4-P2, with the B-frames being displayed between the flanking reference frames upon which they depend. Because of these dependencies, typical MPEG decoders usually comprise at least three buffers for holding decoded images: a pair of reference frames are retained so that a third frame—a B-frame—can be decoded before being displayed. Three buffers generally are sufficient.

Playing video in reverse, as is provided in most DVD players, and other MPEG players, such as some video-on-demand (VOD) systems and the like, presents an immediate difficulty. Consider a hypothetical case, posed for clarity of explanation:

"Suppose an MPEG sequence is presented from a DVD with only one I-frame followed by 5 P-frames: I1-P2-P3-P4-PS-P6. In this case, each frame depends upon its predecessor and the decode order and forward display order are identical. How would we this sequence be played in reverse?"

Reverse order means displaying, first P6, then P5, and so on, down to P2, and then finally I1. But P6 cannot be decoded without first decoding P5, which in turn requires that P4 be decoded, and so on. In fact, all 6 frames must be decoded before the reverse display process can begin. This is not a problem if the DVD player includes 6 display buffers, but because the example presented herein is simplistic, it will be assumed that only 3 display buffers—which suffice for forward playback-are available.

During the reverse playback operation of the above example, the buffers first are filled with I1, P2, and P3. To decode P4, however, a value in one of the buffers must be overwritten. Either I1 or P2 can be overwritten, but P3 must remain in a buffer in order to decode P4. By the time P6 is to be decoded, the buffers will contain P4, P5, and P6, which then can be displayed in reverse order: P6, then P5, then P4. After doing this, I1, P2, and P3 will need to be re-decoded before they can be displayed: P3, then P2, then I1.

Note that in this example, each of the first three frames had to be decoded twice. With longer dependent sequences, the amount of redundant decoding further increases; for example, if there are 8 P-frames instead of 5, then the first three frames would be decoded three separate times, while the second three would be decoded twice. This shows why it is generally difficult to implement a smooth reverse play on MPEG players. The goal is to display frames in reverse order at the normal rate of 30 frames per second, but the excessive re-decoding, which is required by the DVD and other MPEG players of the prior art as illustrated above, makes it very difficult to keep up with that rate. Thus, with the prior art MPEG players, to recover the time lost in re-decoding frames, the players typically omit frames from the reverse playback sequence, which leads to reverse playback at accelerated speeds. One particularly simple strategy is to decode and display only the independent I-frames, which leads to especially fast reverse playback, but poor motion quality.

Thus, what is needed is a system and method for playing MPEG encoded media in reverse at the forward playback speed (i.e., 30 frames/second) without sacrificing motion quality or smoothness by skipping some of the frames while playing the video in reverse.

SUMMARY OF THE INVENTION

A method and an apparatus for performing the method of decoding and playing in reverse MPEG encoded content. The MPEG encoded content comprises a plurality of pictures frames. The picture frames are comprised of one or more picture frame types selected from the group of picture frame types including I-frames, P-frames, and B-frames. The method and the apparatus for performing the method comprise the steps of obtaining a group of MPEG picture frames ("GOP"), determining the total number of picture frames in the GOP, and setting an index value equal to the total number of picture frames in the GOP. Next, a picture frame F that has a display order equal to the index value is decoded and displayed, and the earliest B-frame that depends upon frame F is determined. All the B-frames that depend upon frame F are decoded and displayed from highest display order to lowest display order, and the index value then is set to a value equal to one less than the display order of the earliest B-frame that depends upon frame F. The process then repeats by obtaining, decoding and displaying the next frame F having a display order equal to the index value, and decoding and displaying the B-frames that depend upon the frame F.

In accordance with another embodiment of the present invention, the step of decoding and displaying a picture frame F comprises first decoding each picture frame upon which frame F depends. In addition, the step of decoding and displaying a picture frame F comprises determining which slot in a decode buffer should be used to hold the next frame to be decoded by determining which slot in the decode buffer holds a frame FR with the earliest display sequence.

A more complete understanding of the present invention may be derived by referring to the detailed description of preferred embodiments and claims when considered in connection with the figures, wherein like reference numbers refer to similar items throughout the figures.

DESCRIPTION OF THE SPECIFIC EMBODIMENTS

Figure 1:
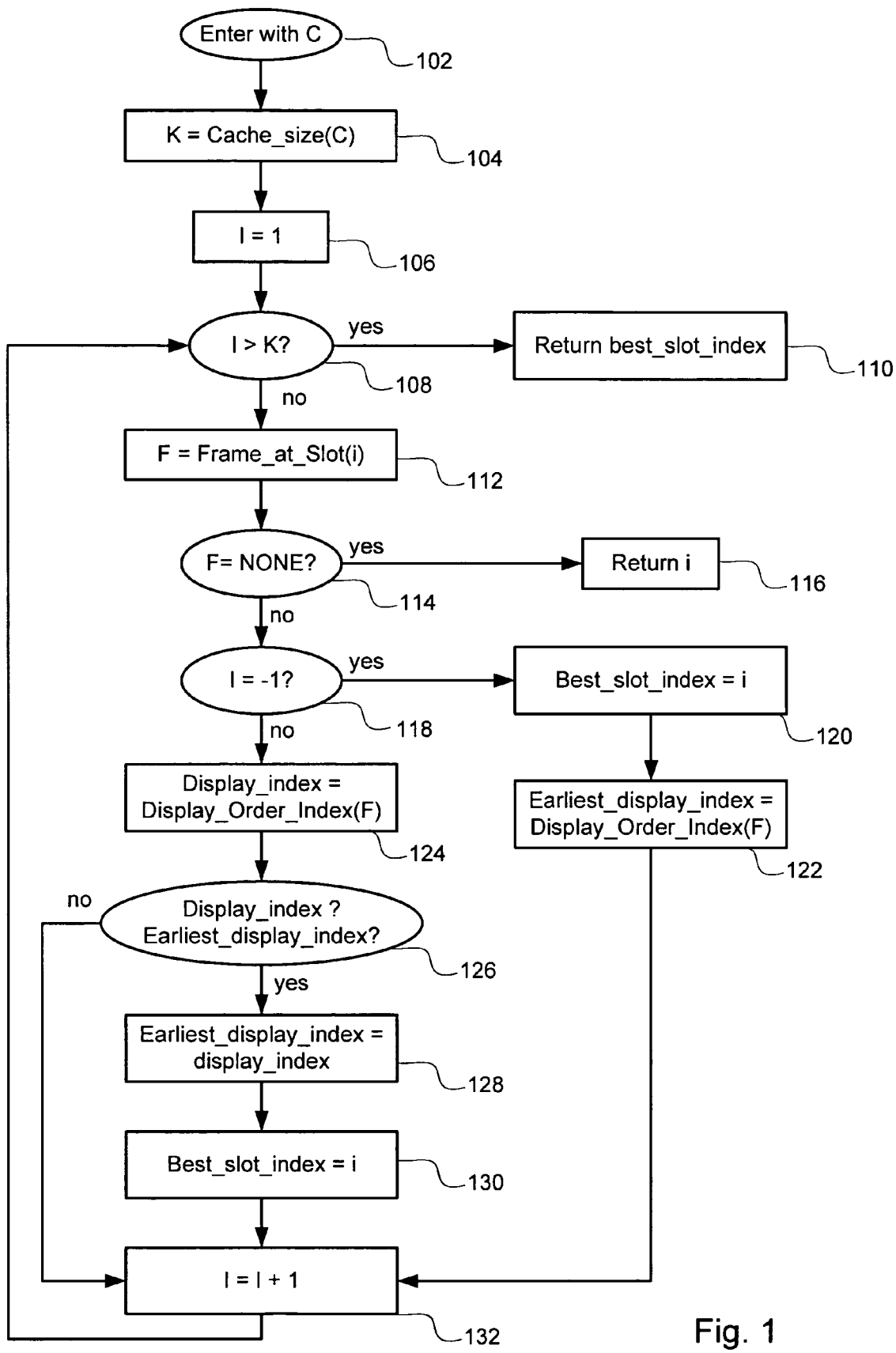
FIG. 1 is a flow diagram illustrating a method in accordance with one embodiment of the present invention for selecting a preferred decode buffer to use.

The present invention relates to a system and method for playing MPEG encoded media in reverse, and more particularly to a method for the efficient use of limited display buffers, to allow smooth playback of media in the reverse direction. The reverse playback of the present invention is considered "smooth" because no frames are dropped, and they are displayed at normal speed—only in reverse order. This also sometimes is referred to as "slow reverse playback," because it is slower than the reverse playback speeds normally available on DVD and other media players. The present invention is described herein with reference to DVD players playing MPEG video (and audio). However, one skilled in the art will appreciate that the system and method of the present invention can be used in any device, which decodes and plays MPEG encoded media. For example, a set-top box or server responsible for playing video-on-demand content may embody the present invention. Also, any type of computer system that is configured to play MPEG encoded media may embody the present invention. Therefore, the present invention is not limited to DVD players. In addition, the term MPEG, as used herein, shall mean any and suitable compression format, such as MPEG-1, MPEG-2, MPEG-4, or any other compression format hereinafter developed. The term MPEG media shall mean any media content that can be encoded in a compressed digital format, such as MPEG. The content can be video content, audio content, or any other suitable data content.

With MPEG media, data is presented as a "Group of Pictures" ("GOP"), which typically is presented in forward, normal play mode, but which also can be played in reverse. In describing the present invention, MPEG frames will be designated in the form Fn.m: where F is the frame type (either I, P, or B); where n is an integer giving the frame's decode sequence position; and where m is an integer giving the frame's display sequence position.

One embodiment of a method of the present invention for playing NPEG media in reverse will be presented in the form of an example. The example presented herein will use the GOP set forth below. The example is presented in the notation Fn.m:

TABLE 1

| Frame | Frame Type | Decode Order | Display Order |
|-------|------------|--------------|---------------|
| I1.1  | I-frame    | 1            | 1             |
| P2.4  | P-frame    | 2            | 4             |

TABLE 1-continued

| Frame  | Frame Type | Decode Order | Display Order |
|--------|------------|--------------|---------------|
| B3.2   | B-frame    | 3            | 2             |
| B4.3   | B-frame    | 4            | 3             |
| P5.6   | P-frame    | 5            | 6             |
| B6.5   | B-frame    | 6            | 5             |
| I7.9   | I-frame    | 7            | 9             |
| B8.7   | B-frame    | 8            | 7             |
| B9.8   | B-frame    | 9            | 8             |
| P10.11 | P-frame    | 10           | 11            |
| B11.10 | B-frame    | 11           | 10            |
| P12.14 | P-frame    | 12           | 14            |
| B13.12 | B-frame    | 13           | 12            |
| B14.13 | B-frame    | 14           | 13            |
| P15.15 | P-frame    | 15           | 15            |

Changing the order around, the reverse playback display order for this example is as follows:

TABLE 2

| Reverse Playback Order | Frame Decode/ Playback Notation |
|------------------------|--------------------------------|
| P.15                   | P15.15                         |
| P.14                   | P12.14                         |
| B.13                   | B14.13                         |
| B.12                   | B13.12                         |
| P.11                   | P10.11                         |
| B.10                   | B11.10                         |
| I.9                    | I7.9                           |
| B.8                    | B9.8                           |
| B.7                    | B8.7                           |
| P.6                    | P5.6                           |
| B.5                    | B6.5                           |
| P.4                    | P2.4                           |
| B.3                    | B4.3                           |
| B.2                    | B3.2                           |
| I.1                    | I1.1                           |

In the example presented herein, when only a single integer index is given without a decimal point, it denotes the decode order of the GOP, for example, I1, P2, B3, B4, P5, etc. If a single integer index is given with a decimal point, it denotes the display order, for example, I.1, B.2, B.3, P.4, etc.

As stated above, the frame dependency rules are as follows:

(1) an I-frame has no dependency;

(2) a P-frame is dependent upon the reference frame (i.e., either a P-frame or an I-frame) that most-closely precedes it in decode order;

(3) a B-frame is dependent upon the closest preceding and following reference frames, in display order.

Given a GOP, for example the GOP in Table 1, the following information can be determined for any frame, F:

(a) which, if any, frame precedes F in normal display order, on which F depends (hereinafter referred to as Preceding_Dependency (F)); and (b) which, if any, frame follows F in normal display order, on which F depends (hereinafter referred to as Following_Dependency (F)).

Each of these operations applied to a particular frame F may return either the identity of the sought-after frame, or an indication that no such frame exists. If no frame exists, the value NONE is used. Thus, if F is an I-frame, then both these operations will return NONE, since an I-frame depends on no other frame in either direction. For P-frames, the Following_Dependency (F) operation will always return NONE, since only a preceding dependency exists for P-frames.

An example of these values for frames from the GOP defined in Table 1 is as follows:

Preceding_Dependency (B3.2) returns I1.1
Following_Dependency (B3.2) returns P2.4
Preceding_Dependency (P2.4) returns I1.1
Following_Dependency (P2.4) returns NONE
Preceding_Dependency (I7.9) returns NONE
Following_Dependency (I7.9) returns NONE A full table of dependencies is shown below in Table 3, which is most easily constructed visually after sorting the frames into display order.

TABLE 3

| F | Preceding_Dependency (F) | Following_Dependency (F) |
|---|---|---|
| I1.1 | NONE | NONE |
| B3.2 | I1.1 | P2.4 |
| B4.3 | I1.1 | P2.4 |
| P2.4 | I1.1 | NONE |
| B6.5 | P2.4 | P5.6 |
| P5.6 | P2.4 | NONE |
| B8.7 | P5.6 | I7.9 |
| B9.8 | P5.6 | I7.9 |
| I7.9 | NONE | NONE |
| B11.10 | I7.9 | P10.11 |
| P10.11 | I7.9 | NONE |
| B13.12 | P10.11 | P12.14 |
| B14.13 | P10.11 | P12.14 |
| P12.14 | P10.11 | NONE |
| P15.15 | P12.14 | NONE |

Another parameter that is useful for presenting the systems and methods of the present invention is the parameter Earliest_Dependent_BFrame (F). This parameter only applies to reference frames (I and P), and returns the first B-frame, in normal display order, that depends upon F. The B-frame will precede F in display order, but follow it in decode order. As with the dependency operators defined above, Earliest_Dependent_BFrame (F) can return NONE to signify that there is no B-frame that depends upon frame F.

Table 4 illustrates the Earliest_Dependent_BFrame (F) parameter for each of the reference frames in the GOP from Table 1. In Table 4, the frames are sorted into display order for ease of interpretation. (Note: the operator indeed can be applied to B-frame arguments, but the return value is NONE in such cases. Therefore, the Earliest_Dependent_BFrame is not shown for B-frames.)

TABLE 4

| F | Earliest_Dependent_BFrame (F) |
|---|---|
| I1.1 | NONE |
| B3.2 | |
| B4.3 | |
| P2.4 | B3.2 |
| B6.5 | |
| P5.6 | B6.5 |
| B8.7 | |
| B9.8 | |
| I7.9 | B8.7 |
| B11.10 | |
| P10.11 | B11.10 |
| B13.12 | |
| B14.13 | |
| P12.14 | B13.12 |
| I15.15 | NONE |

The GOP consists of a series of pictures, also called frames, which are not decoded. If the GOP consisted entirely of I-frames, which have no dependencies, then forward or reverse play would be trivial. Due to dependencies, even normal (forward) play requires a cache of at least 3 frame buffers, into which decoded frames are stored.

In accordance with one embodiment of the present invention, to decode a group of pictures (GOP) in MPEG format, any number K of frame buffers can be used. However, as indicated previously, K should be greater than or equal to 3. Efficient use of the frame buffer cache is important to smooth reverse playback. Thus, in accordance with one embodiment of the present invention, three principles for managing frame buffers may be used. The buffer management (BM) principles are as follows:

BM1: Do not decode a frame until it is necessary to do so.
BM2: Free up a frame buffer at the earliest opportunity.
BM3: When it is necessary to overwrite a frame buffer before its contents have been used, select the buffer whose decoded frame has the earliest display order index.

BM1 means, for example, that early B-frames, which do not contribute to the decoding of the final frames that must be displayed first, will be skipped. This principle helps minimize re-decoding operations, and is a buffer management issue in that that it preserves the buffers for essential contents. Principle BM2 reduces the need to overwrite decoded frames that then will have to be re-decoded subsequently. Principle BM3 follows from the fact that reverse playback requires working backwards in the display sequence, and the earliest display order buffer is the last one needed.

Buffer management principle BM3 is illustrated in a flowchart 100 in FIG. 1. Flowchart 100 illustrates one embodiment of a method for selecting the best buffer slot of a cache C to use (denoted Best_Slot_to_Use (C)), where C represents the cache of K frame buffers. For the Best_Slot_to_Use (C) method of the present invention, it is assumed that each slot of C is either empty or contains a decoded frame, F. Thus, Frame_at_Slot (i), where i runs from 1 to K, either returns a frame, F, or NONE (to indicate the empty state). For each returned frame, F, the decode and display order indices can be obtained using the operators Decode_Order_Index (F) and Display_Order_Index (F), respectively.

Still referring to FIG. 1, the method illustrated in flowchart 100 will be described in more detail. Specifically, to determine the best slot to use, the subroutine is entered with a cache C (step 102). Next, a variable K is set to the cache size of C (step 104), and a variable i is set to 1 (step 106). Then, the subroutine checks to determine if i is greater than K (step 108). For the first iteration, i equals 1, and K is at least 3, so the subroutine moves to the next step, where a variable F is set to the decoded frame that is stored in slot i of the cache buffer (step 112). If there is no frame in the slot i of the cache buffer, F is set to NONE.

After the variable F is set (either to a frame value or to NONE), the subroutine checks to determine if the variable F comprises the value NONE (step 114). If there is no frame in the particular cache location check (F==NONE), the subroutine returns slot location i as a viable slot into which a frame can be decoded (step 116). If there is a frame in slot location i (F!=NONE), then the subroutine checks to see if i equals 1 (step 118). If i equals 1, then the variable best_slot_index is initialized to i (best_slot_index=i=1) (step 120), and the variable earliest_display_index is set to the display order index of the decoded frame stored in variable F (earliest_display_index=Display_Order_Index (F)) (step 122). Then, i is incremented (i=i+1) (step 132), and the subroutine returns to step 108, for the next iteration.

If at step 118, i is not equal to 1, the subroutine sets the variable display_index to the display order of the decoded frame stored in variable F (display_index=Display_Order_Index (F)) (step 124). Next, the value of variable display_index is checked to see if it is smaller than the value of variable earliest_display_index (step 126). If it is not, the variable earliest_display_index stays the same, i is incremented (i=i+1) (step 132), and the subroutine returns to step 108, for the next iteration.

If at step 126, the value of variable display_index is less than the value of the variable earliest_display_index, the variable earliest_display_index is set to the value of the variable display_index (step 128), and the variable best_slot_index is set to i. Explained in a different way, if the frame in cache buffer slot i has a display order less than the earliest_display_index, the earliest_display_index is set to that lower display order value, and the buffer slot i is set as the best_slot_index. Then i is incremented (i=i+1), and the subroutine continues until each cache buffer slot is checked, or an empty buffer slot is found. The examples set forth below will illustrate the method in more detail.

C-like pseudo-code for flowchart 100 illustrated in FIG. 1 is as follows:

```
index Best_Slot_to_Use(C)
{
    K = Cache_Size(C); // number of buffers in cache
    for (i = 1; i < K; i++) {
        F = Frame_at_Slot(i);
        if (F == NONE)
            return i; // return the first empty slot, if any
        // else . . .
        if (i == 1) { // first one examined
            best_slot_index = i;
            earliest_display_index = Display_Order_Index(F);
        }
        else {
            display_index = Display_Order_Index(F);
            if (display_index < earliest_display_index) {
                earliest_display_index = display_index;
                best_slot_index = i;
            }
        }
    }
    return best_slot_index;
}
```

The basic operation of buffer management principle BM1 ("do not decode a frame until it is necessary to do so") is recursive, because dependencies are recursive. For example, to carry out the reverse display indicated in Table 2, frame P.15 is displayed first. However, frame P.15 depends upon P.14, which therefore, should be decoded prior to frame P.15. This recursive operation can be applied to decoding any frame, including B-frames, without any assumption that their dependencies are already in the cache. In C-like pseudo-code, the routine is as follows, with the cache C being treated as a global:

```
Decode_Frame(F)
{
    if (Frame_Not_Already_In_Cache(F)) { // else, nothing to do
        // check that dependencies are already decoded
        F_Preceding = Preceding_Dependency(F);
```

-continued

```
        if (F_Preceding != NONE)
            Decode_Frame(F_Preceding); // recursive call
        F_Following = Following_Dependency(F);
        if (F_Following != NONE)
            Decode_Frame(F_Following); // recursive call
        // now get the best slot to use
        index = Best_Slot_to_Use(C);
        Decode_Frame_Into_Slot(F, C, index);
    }
}
```

Given a GOP, particular frames can be extracted from either the display order index or the decode order index. The indices will run from 1 to N, where N is the number of frames in the GOP:

N=Number_of_Frames (GOP)

The following shorthand notation will be convenient: for i between 1 and N, GOP [i] will denote the i'th frame in decode order, and GOP [.i] will denote the i'th frame in display order.

That is,

F=GOP [i] means that i=Decode_Order_Index (F)

while

F=GOP [.i] means that i=Display_Order_Index (F)

Figure 2:
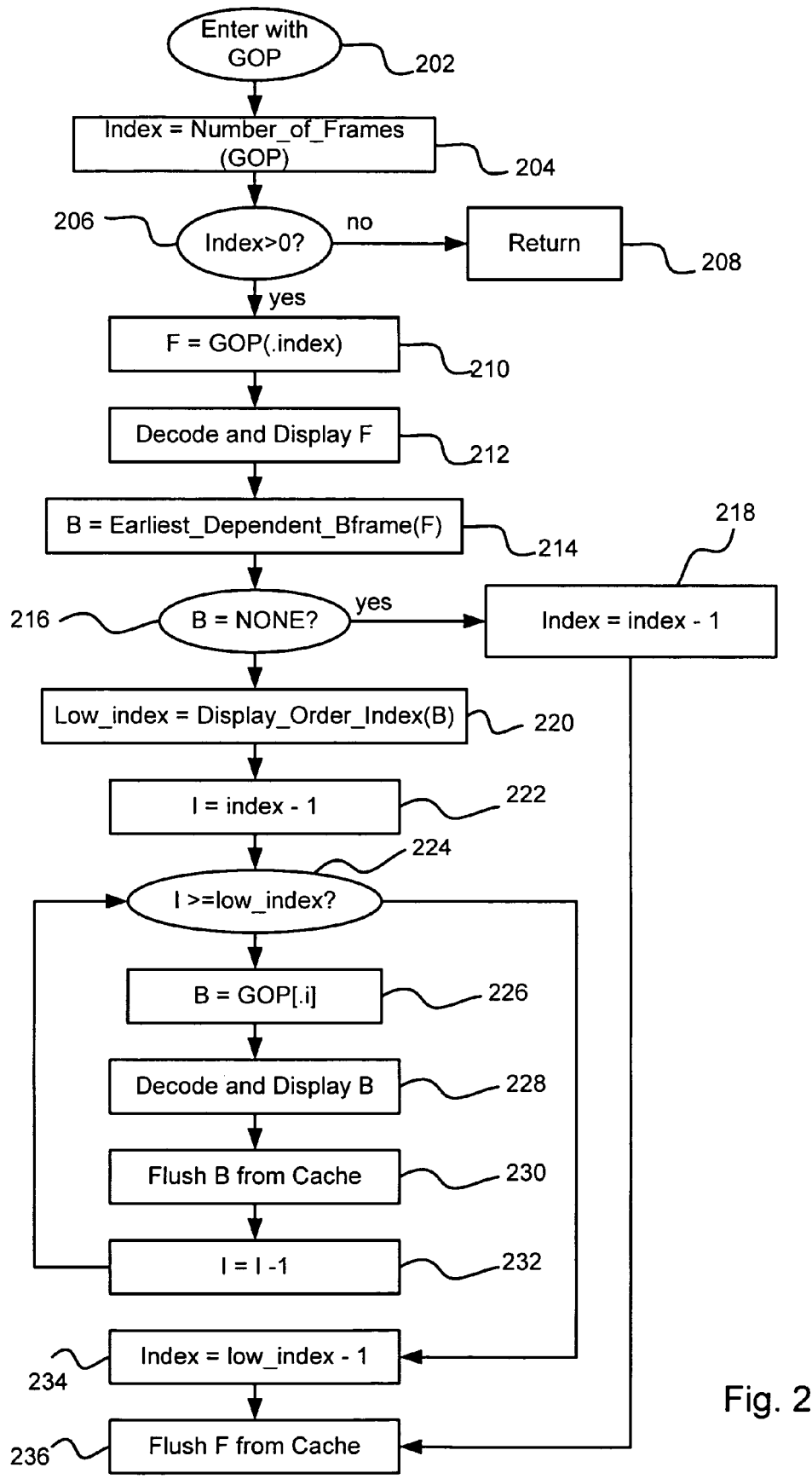
FIG. 2 is a flow diagram illustrating a method in accordance with one embodiment of the present invention for decoding and playing MPEG encoded media in reverse.

In terms of this notation, one embodiment of a method for reverse playback of a GOP is illustrated in flowchart 200 in FIG. 2.

The method of flowchart 200 can be described in words, as follows. The GOP is worked through backwards, starting with frame F=GOP [.index], where index is initialized to the total number of frames in the GOP. Frame F is decoded and displayed. Then, it is determined whether frame F has any dependent B-frames, which precede it and depend upon it. If not, then frame F is flushed from the cache (since it's no longer needed), and the index is decreased by 1. The loop continues while the index is positive.

If there are B-frames that depend upon frame F, then the B-frames are decoded, displayed, and flushed, in turn. Then frame F is flushed from the cache, and the index is set to 1 less than the index of the last B-frame displayed (which is the earliest dependent B-frame).

In accordance with one embodiment of the present invention, only one cache buffer is used for holding decoded B-frames; all the other frame buffers hold reference frames that are needed for subsequent decoding operations. Flowchart 200 will be described below in more detail by way of example.

The pseudo-code for the reverse playback method discussed above is:

```
Slow_Reverse_Play(GOP)
{
    index = Number_of_Frames(GOP);
    while (index > 0) {
        F = GOP [.index];
        Decode_Frame(F);    // decode into frame buffer cache
        Display_Frame(F);   // display decoded frame on TV
        B = Earliest_Dependent_BFrame(F);
        if (B != NONE) {    // if there is a dependent B-frame
            low_index = Display_Order_Index(B); // get its index
            for (i = index-1; i >= low_index; i--) {
                B = GOP [.i];
                Decode_Frame(B);
```

-continued

```
            Display_Frame(B);
            Flush_Frame_From_Cache(B);
            }
            index = low_index - 1;
        }
        else {      // no dependent B-frame
            index--;      // simply decrement index by 1
        }
        // in either case, we are now done with F
        Flush_Frame_From_Cache(F);
    }
}
```

EXAMPLE 1

Still referring to FIGS. 1 and 2, an example of the operation of the Slow Reverse Playback method as applied to the GOP shown in Table 2 now will be presented. This particular example will use a cache of only three frame buffers, which is the minimum number of buffers that typically is required for normal (forward) playback. The example also will be presented below in which four frame buffers are used, and, as one skilled in the art will appreciate, the method can apply to any number of frame buffers in a cache.

As illustrated in FIG. 2, the reverse playback method is entered with a group of pictures (GOP) (step 202), and then the index is set to 15, the number of frames in the GOP (index=Number_of_Frames (GOP)=15) (step 204). Next, the index is checked to determine if it is greater than 0 (step 206). In this case the index is 15, so the next step to be processed is step 210.

Loop Iteration 1:

Frame F is set to the frame that has a display order equal to the index (step 210). In the case in which the index is 15, F=P.15. Next, frame F is decoded and displayed (step 212). To decode and display frame F, the subroutine Decode_Frame (F) is called. The subroutine Decode_Frame (F) is a recursive operation, which first decodes all the frames upon which frame F depends. For example, in the present example, decoding P.15 requires first decoding P.14; decoding P.14 requires first decoding P.11; and decoding P.11 requires first decoding I.9, which has no dependencies. Thus, frame I.9 first should be decoded, then frame P.11, then P.14, and then P.15. After decoding the first three frames, the cache comprises the following values:

slot 1: I.9
slot 2: P.11
slot 3: P.14

At this point, a slot in the decode buffer is needed to decode frame P.15. Subroutine Best_Slot_to_Use (C) is called to determine which slot in the decode buffer should be overwritten with frame P.15.

As discussed above, the Best_Slot_to_Use (C) subroutine is illustrated in flowchart 100 in FIG. 1. To determine the best slot to use, the subroutine is entered with a cache C, which has 3 buffer slots in this example (step 102). Next, K is set to 3, the size of cache C (step 104), and the variable i is set to 1 (step 106). Next, the subroutine checks to determine if i is greater than K (step 108). At this point in the routine, i=1, and K=3, so i clearly is not greater than K, and thus, the subroutine continues to step 112. At step 112, F is set to the decoded frame that is stored in slot i of the cache buffer. If there is no frame in the cache buffer location checked, F is set to NONE. In this particular example, the frame in slot 1 of the cache buffer is I.9, so F=I.9.

After the variable F is set (either to a frame value or to NONE), the subroutine checks to determine if the variable F comprises the value NONE (step 114). If F=NONE, it means that there is no frame in that cache location, so the subroutine returns slot location i as a viable slot into which a frame can be decoded (step 116). If there is a frame in slot location i (F!=NONE), then the subroutine checks to see if i=1 (step 118).

In accordance with the example being presented herein, i currently is 1, so the variable best_slot_index is set to 1 (step 120). In addition, F=I.9, so the variable earliest_display_index is set to 9, which is the display order of frame I.9 (step 122). Next, i is incremented (i=i+1=2) (step 132) and the subroutine returns to the top (step 108).

For the next iteration, i=2 and K=3, so the routine continues by setting F to the value P.11 (the decoded frame in slot 2 of the buffer) (step 112). F does not equal NONE, and i does not equal 1 (check at step 118), so the variable display_index is set to 11 (the display order of frame F=P.11) (step 124). Since variable display_index is 11 and the variable earliest_display_index is 9, the subroutine increments i (i=i+1=3) (step 132) and then returns to the top (step 108). The process continues by checking buffer location 3. Buffer location 3 has the frame P.14 stored in it, so F is set to P.14 (step 112), and the variable display_index is set to 14, which is the display order for frame P.14 (step 124). Again, since the display_index (14) is greater than the earliest_display_index (9), the variables earliest_display_index and best_slot_index do not change.

Next, i is incremented (i=i+1=4) (step 132) and the routine returns to the top (step 108). Since i (4) is greater than K (3), the subroutine ends by returning the best_slot_index value of 1. This means that frame P.15 should decoded in slot 1, writing over frame I.9 currently in slot 1. Thus, frame I.9 eventually will need to be re-decoded. The cache now comprises the following values:

slot 1: P.15
slot 2: P.11
slot 3: P.14

After frame P.15 is decoded, it is displayed (step 212). Next, the system sets the variable B equal to Earliest_Dependent_BFrame (F) (step 214). Table 4, lists the Earliest_Dependent_BFram(F) for all frame in the GOP of the present example. In this particular example B=NONE, as frame P.15 does not have any B frames dependant upon it. Thus, the index is decremented by 1 (index=index−1=14) (step 218), and frame P.15 is flushed from buffer location 1 (step 236). The cache now comprises the following values:

slot 1:
slot 2: P.11
slot 3: P.14

Loop Iteration 2:

The index now is 14. Frame F is set to the frame that has a display order equal to the index (step 210). In the case in which the index is 14, F=P.14.

Frame P.14 already is in the cache, so it does not need to be decoded. Frame P.14 is displayed (step 212), and then it is determined whether any B-frames depend upon frame P.14. In this case, as illustrated in Table 3, B.13 and B.12 both depend from frame P.14. As illustrated in Table 4, the Earliest_Dependent_BFrame (F) for F=P.14 is B.12. Thus, variable B is set to B.12 (step 214). Since B does not equal NONE, the variable low_index is set equal to the Display_Order_Index(B) (step 220). In this case, the Display_Order_Index(B) for B.12 is 12, so low_index is set to the value 12.

Next, the variable i is set according to the formula: i=index−1 (step 222). In accordance with the present example, i=14−1=13.

Next, the i is compared with low_index to determine if i is greater than or equal to low_index (step 224). In accordance with this particular example, i=13, and low_index=12, so B is set to frame B.13 (B=GOP[.i]=B.13) (step 226). Next, frame B.13 is decoded and displayed (step 228). The sub-routine Decode_Frame (B) is used to determine which other frames need to be decoded in order to decode frame B.13. In this particular case, the preceding dependency for B.13 is P.11, and the following dependency for B.13 is P.14, both of which have already been decoded into the buffer. Since slot 1 is open, frame B.13 is decoded into slot 1 using its dependencies P.11 and P.14. The buffer now comprises:
  slot 1: B.13
  slot 2: P.11
  slot 3: P.14

After being decoded, frame B.13 is displayed (step 228), and then flushed from the cache (step 230). The cache now comprises:
  slot 1:
  slot 2: P.11
  slot 3: P.14

Next, i is decremented by 1 to 12 (step 232), and B.12 is decoded into the buffer (steps 224–228). As with frame B.13, the sub-routine Decode_Frame (B) is used to determine which other frames need to be decoded in order to decode frame B.12. Again, as with frame B.13, the preceding dependency for B.12 is P.11, and the following dependency for B.12 is P.14, both of which are still in the buffer. Since slot 1 is open, frame B.12 is decoded into slot 1 (step 228). The cache now comprises:
  slot 1: B.12
  slot 2: P.11
  slot 3: P.14

Frame B.12 is displayed (step 228) and flushed (step 230). The cache now comprises:
  slot 1:
  slot 2: P.11
  slot 3: P.14

Next, i is decremented by 1 to 11 (step 232). Since i now is less than low_index, which is 12, this run of B-frames is finished (step 224). Next, the index is set to 11 (index=low_index−1=11) (step 234), and frame P.14 is flushed from the cache buffer, since it already has been displayed, and no other frames depend upon it (step 236). The cache now comprises:
  slot 1:
  slot 2: P.11
  slot 3:

Loop Iteration 3:
Next, the subroutine returns to the top of the loop (step 206), where it checks whether index is greater than 0. Index=11, so F is set to P.11 (step 210). Frame P.11 already is in the cache, so it does not need to be decoded. Frame P.11 is displayed (step 212), and then it is determined whether any B-frames depend upon frame P.11, which one does (B.10) as illustrated in Table 3 (steps 214–216). As illustrated in Table 4, the Earliest_Dependent_BFrame (F) (the earliest B-frame that depends upon frame P.11) is B.10, so low_index is set to 10 (step 220), and i is set to the value index−1 (i=index−1=10) (step 222). Next, frame B.10 is decoded using the subroutine Decode_Frames (F) (step 226–228). The preceding dependency for frame B.10 is I.9, which is no longer in the cache. Thus, frame I.9 needs to be decoded. The following dependency for frame B.10 is P.11, which already is in the cache. The cache now comprises:
  slot 1: I.9 // second time decoding I.9
  slot 2: P.11
  slot 3: B.10

Frame B.10 is displayed (step 228) and then flushed (step 230). The variable i is decremented by 1, so that it now has the value 9 (step 232). The cache now comprises:
  slot 1: I.9
  slot 2: P.11
  slot 3:

Since low_index is 10 and i is 9 (step 224), this run of dependent B-frames is finished. Next, the index is set to 9 (index=low_index−1=9) (step 234), and frame P.11 is flushed from the cache, since it already has been displayed and no other frames depend upon it (step 236). The cache now comprises:
  slot 1: I.9
  slot 2:
  slot 3:

Loop Iteration 4:
Next, the subroutine returns to the top of the loop (step 206), where it checks whether index is greater than 0. Index=9, so F is set to I.9 (step 210). Frame I.9 already is in the cache, so it does not need to be decoded. Frame I.9 is displayed (step 212), and then it is determined whether any B-frames depend upon frame I.9, which two do (B.8 and B.7) as illustrated in Table 3 (steps 214–216). As illustrated in Table 4, the Earliest_Dependent_BFrame (F) (the earliest B-frame that depends upon frame I.9) is B.7, so low_index is set to 7 (step 220), and i is set to the value index−1 (i=index−1=8) (step 222). Next, frame B.8 needs to be decoded using the subroutine Decode_Frames (F) (step 226–228). As illustrated in Table 3, the preceding dependency for B.8 is P.6, the preceding dependency for P.6 is P.4, and the preceding dependency for P.4 is I.1. Thus, frames I.1, P.4, P.6 and B.8 need to be decoded in that order. When decoding the frames, the subroutine Best_Slot_to_Use (C) as discussed above preferably is used. Since the subroutine Best_Slot_to_Use (C) is discussed in great detail above, it will not be explained any further here, and only the results we be presented. Accordingly, frame I.1 is decoded into slot 2, and frame P.4 is decoded into slot 3. The cache now comprises:
  slot 1: I.9
  slot 2: I.1
  slot 3: P.4

Next, frame P.6 is decoded into slot 2, since it contains the frame with the earliest display index. After decoding frame P.6 into slot 2, the cache now comprises:
  slot 1: I.9
  slot 2: P.6
  slot 3: P.4

Next, frame B.8 is decoded into slot 3, overwriting frame P.4, the frame with earliest display index. The cache now comprises:
  slot 1: I.9
  slot 2: P.6
  slot 3: B.8

Frame B.8 depends on preceding frame P.6 and following frame I.9, both of which are decoded in the cache. Therefore, B.8 is displayed (step 228) and flushed from the cache (step 230). The variable i is decremented by 1 (i=i−1=7) (step 232). Since frame B.7 has the same dependencies as frame B.8, no other frames need to be decoded to decode frame B.7. Accordingly, frame B.7 is decoded into slot 3 of the buffer (steps 224–228). The cache now comprises:

slot 1: I.9
slot 2: P.6
slot 3: B.7

Next, frame B.7 is displayed (step 228) and flushed (step 230), index is set to low_index−1 (index=low_index−1=6) (step 234), and frame I.9 is flushed from the buffer. The cache now comprises:
slot 1:
slot 2: P.6
slot 3:
Loop Iteration 5:

Next, the subroutine returns to the top of the loop (step 206), where it checks whether indexis greater than 0. Index=6, so F is set to P.6 (step 210). Frame P.6 is already in the cache, so it is displayed (step 212). Frame P.6 has one B-frame that depends upon it (B.5). Decoding frame B.5 requires frame P.4 to be decoded, which requires frame I.1 to be decoded. Thus, frames I.1, P.4 and B.5 need to be decoded in succession. First, frame I.1 is decoded into slot 1 and frame P.4 is decoded into slot 3. Preferably, subroutines Decode_Frame (F) and Best_Slot_to_Use (C) are used to determine which frames are to be decoded into which slot s. The cache now comprises:
slot 1: I.1//second time decoding I.1
slot 2: P.6
slot 3: P.4//second time decoding P.4

Next, frame B.5 is decoded into slot 1, writing over frame I.1, since it has the earliest display index. The cache now comprises:
slot 1: B.5
slot 2: P.6
slot 3: P.4

Frame B.5 is displayed (step 228) and flushed (step 230), index is set to low_index−1 (index=low_index−1=4) (step 234), and frame P.6 is flushed, since it already has been displayed, and no other frame depends upon in (step 236). The cache now comprises:
slot 1:
slot 2:
slot 3: P.4
Loop Iteration 6:

Next, the subroutine returns to the top of the loop (step 206), where it checks whether index is greater than 0. Index=4, so F is set to P.4 (step 210). Frame P.4 is already in the cache, so it is displayed (step 212). Frame P.4 has two B-Frames that depend upon it (B3 and B2). Decoding frame B.3 requires frames P.4 and I.1 to be decoded. Frame P.4 is already in the cache, so frame I.1 is decoded into slot 1 of the cache. Next, frame B.3 is decoded into slot 3 (step 228). The cache now comprises:
slot 1: I.1//third time decoding I.1
slot 2: B.3
slot 3: P.4

Next, frame B.3 is displayed (step 228) and flushed (step 230). The cache now comprises:
slot 1: I.1
slot 2:
slot 3: P.4

Next, frame B.2 is decoded (step 228). Frame B.2 has the same dependencies as B.3, which are already in the cache. The cache now comprises:
slot 1: I.1
slot 2: B.2
slot 3: P.4

Frame B.2 is displayed (step 228) and flushed (step 230), index is set to low_index−1 (index=low_index−1=1) (step 234) and frame P.4 is flushed from the cache (step 236). The final loop is entered with the cache comprising:
slot 1: I.1
slot 2:
slot 3:
Loop Iteration 7:

For the last iteration, the subroutine returns to the top of the loop (step 206), where it checks whether index is greater than 0. Index=1, so F is set to I.1 (step 210). Frame I.1 is already in the cache, so it is displayed (step 212). Frame I.1 has no dependent B-frames, so the index' is decremented by 1 (index=index−1=1−1=0) (step 218), and frame I.1 is flushed from the cache (step 236). At step 206, since index=0, the subroutine is done.

Summary: frames I.9 and P.4 were decoded twice, while frame I.1 was decoded three times. Thus, display 15 frames in reverse order using a three-slot cache, 4 extra decoding operations were needed for a total of 19. The inefficiency can be illustrated as 4/15=27%.

EXAMPLE 2

In this example, the same process will be followed, but it will be described in a more abbreviated fashion. In this particular example of the present invention, the frame-buffer cache comprises four slot s instead of three.
Loop Iteration 1:
F=P.15

As above, the GOP of the present example should be decoded in the sequence: I.9, P.11, P.14, and then P.15. Following this sequence, the cache comprises:
slot 1: I.9
slot 2: P.11
slot 3: P.14
slot 4: P.15

Since P.15 has no dependent B-frames, it is simply displayed and flushed, and the index decremented by 1 to 14. Starting the second iteration, the cache comprises:
slot 1: I.9
slot 2: P.11
slot 3: P.14
slot 4:
Loop Iteration 2:
F=P.14

Frame P.14 is displayed. Then it is determined how may B-frames depend upon frame P.14. In this case frame P.14 has two dependent B-frames (B.13 and B.12). Both frames B.13 and B.12 depend upon frames P.14 and P.11, both of which are decoded in the cache. Thus, frame B.13 is decoded into available slot 4 of the buffer, displayed and then flushed. Next, the index is set to 12, and B.12 then is decoded into slot 4, displayed, and then flushed. P.14 then is flushed, and the index is set to low_index−1=12−1=11. Iteration 3 is entered with the cache comprising:
slot 1: I.9
slot 2: P.11
slot 3:
slot 4:
Loop Iteration 3:
F=P.11

Frame P.11 first is displayed. Then it is determined how many B-frames depend upon P.11. In this case, frame P.11 has one dependent B-frame, B.10, which depends from both P.11 and I.9, both of which are already decoded in the cache.

Thus, B.10 is decoded into slot 3, displayed, and flushed, and then the index is set to low_index−1=9. Frame P.11 then is flushed, and iteration 4 is entered with the cache comprising:
slot 1: I.9
slot 2:
slot 3:
slot 4:
Loop Iteration 4:
F=I.9
Frame I.9 first is displayed. As with the other iterations, the next step is to determine how many B-frames depend upon frame I.9. In this case, I.9 has two dependent B-frames (B.8 and B.7). Both frames B.8 and B.7 depend upon frame I.9, which is already in the cache, and upon P.6, which needs to be decoded. The recursive dependencies for P.6 require the decoding sequence I.1, P.4, and then P.6. Thus the cache comprises:
slot 1: I.9
slot 2: I.1
slot 3: P.4
slot 4: P.6
Next, frame B.8 is decoded into slot 2, since I.1 has the earliest display order index. First, frame B.8 is decoded into slot 2, displayed, and then flushed. Next, frame B.7 is decoded into slot 2, displayed, and then flushed. After frame B.7 has been flushed, the index is set to low_index−1=6 and frame I.9 is flushed. Iteration 5 is entered with the cache comprising:
slot 1:
slot 2:
slot 3: P.4
slot 4: P.6
Loop Iteration 5:
F=P.6
Frame P.6 first is displayed, and then the dependent B-frames are determined. In this case P.6 has one dependent B-frame, B.5. Frame B.5 depends upon frames P.6 and P.4, both of which are already decoded into the cache buffer. Thus, B.5 is decoded into slot 1, displayed, and then flushed. Next, the index is set to 4, and frame P.6 is flushed. Iteration 6 is entered with the cache comprising:
slot 1:
slot 2:
slot 3: P.4
slot 4:
Loop Iteration 6:
F=P.4
Frame P.4 is displayed and the dependent B-frames are determined. Frame P.4 has two dependent B-frames, B.3 and B.2, both requiring the re-decoding of I.1. Thus, I.1 is decoded into the buffer, and the cache now comprises:
slot 1: I.1//decoded for the second time
slot 2:
slot 3: P.4
slot 4:
First frame B.3 is decoded into slot 2, displayed and flushed. Next, frame B.2 is decoded into slot B.2, displayed, and flushed. The index is set to 1, and frame P.4 is flushed from slot 3. The final iteration is entered with the cache comprising:
slot 1: I.1
slot 2:
slot 3:
slot 4:
Loop Iteration 7:
F=I.1

Frame I.1 is displayed and flushed. The subroutine is finished.

As illustrated by the second example, when 4 buffer slots are used, only frame I.1 is decoded twice. Thus, with 4 buffer slots, 16 decodes are needed to play 15 frames in reverse. The inefficiency is illustrated as $\frac{1}{15}=6.7\%$; much less than the inefficiency created by using only 3 buffer slots. Obviously, if 5 buffer slots are used, no frame will need to be decoded more than once, and the efficiency increases even more. As one skilled in the art will appreciate, a typical group of pictures has more than 15 frames, so some multiple decoding of frames may be needed. However, using the system and method of the present invention along with additional cache buffer slots will allow smooth reverse playback of MPEG encoded media.

CONCLUSION

In conclusion, the present invention provides a novel method and novel systems for implementing the method for smooth reverse playback of MPEG encoded media. While a detailed description of presently preferred embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A memory efficient method of smooth reverse playback of an encoded video stream formed of a number of encoded video frames arranged in a forward order sequence, comprising:
providing a pool of memory buffers;
in a smooth reverse playback mode,
storing an immediately display one of the encoded video frames in one of the memory buffers;
changing a memory buffer status of the one of the memory buffers from available to unavailable based upon the storing thereby rendering the memory buffer unavailable for storing additional data;
decoding the stored encoded video frame only immediately prior to the display of the decoded video frame;
displaying the decoded video frame; and
changing the status of the memory buffer from unavailable to available immediately after the displaying thereby rendering the memory buffer available for storing additional data.

2. A method as recited in claim 1, wherein when there are no available memory buffers for the storing, then
determining which of the memory buffers includes an earliest display order sequence decoded video frame;
changing the status of the determined memory buffer from unavailable to available; and storing a next one of the encoded video frames in the available memory buffer.

3. A method as recited in claim 1, further comprising:
decoding the stored encoded video frame; and
displaying the decoded video frame.

4. A method as recited in claim 1, further comprising:
when a particular encoded video frame is to be decoded, then
determining if the particular encoded video frame is dependent upon one or more of the other encoded video frames;
when the particular encoded video frame is determined to be dependent upon another encode video frame, then recursively determining if the other encoded video frame is dependent upon still other encoded video frames; and repeating the determining until it is determined that there are no further dependent encoded video frames.

5. A method as recited in claim 4, wherein the encoded video stream is an MPEG encoded video stream and wherein the number of encoded video frames includes some I type video frames having no dependency, some P type video frames each of which are dependent upon an immediately preceding I type video frame or an immediately preceding other P type video frame in the forward display mode, and some B type video frames each of which is dependent on at least two reference frames one of which immediately precedes the B type video frame and the other which immediately follows the B type video frame in the forward display mode.

6. A method as recited in claim 5 wherein the encoded video stream is formed of a number of groups of pictures (GOP) each of which includes a number of dependent encoded video frames that are arranged in the display order sequence.

7. A method as recited in claim 6, wherein in the reverse playback mode, a first decoded video frame to be displayed is a last decoded video frame corresponding to a last one of the encoded video frames included in a particular GOP.

8. A method as recited in claim 1, wherein the method is performed by a multimedia player unit.

9. A method as recited in claim 8, wherein the multimedia player unit is a DVD player unit or a set top box.

10. A multimedia player unit, comprising:
a mode selector arranged to select between a forward display mode and a smooth reverse display mode;
a memory unit coupled to the mode selector unit having a number of memory buffers each having a memory buffer state identified therewith wherein when the memory buffer state is available, then the associated memory buffer is available to store data and wherein when the memory buffer state is unavailable, then the associated memory buffer is not available for storing data;
a decoder unit arranged to decode an encoded video frame stored in a selected memory buffer; and
a display unit arranged to display a decoded video frame, wherein during the reverse playback mode, an immediately displayable one of the encoded video frames is stored in one of the memory buffers and the memory buffer status is changed from available to unavailable and the stored encoded video frame is then decoded only immediately prior to display of the decoded video frame, and immediately after the display of the decoded video frame the status of the memory buffer is changed from unavailable to available.

11. A multimedia player unit as recited in claim 10, wherein when there are no available memory buffers for the storing, then the status of the memory buffer having an earliest display order sequence decoded video frame stored therein is from unavailable to available and a next one of the encoded video frames in then stored in the now available memory buffer.

12. A multimedia player unit as recited in claim 11, wherein the decoder unit decodes the stored encoded video frame which is then displayed on the display unit.

13. Computer program product for smooth reverse playback of an encoded video stream formed of a number of encoded video frames arranged in a display order sequence corresponding to a forward display mode, comprising:

computer program product for selecting a smooth reverse playback mode in a device having a number of memory buffers, computer program product storing an immediately displayable one of the encoded video frames in one of the memory buffers;

computer program product changing a memory buffer status of the one of the memory buffers from available to unavailable based upon the storing thereby rendering the memory buffer unavailable for storing additional video frame data;

computer program product decoding the stored encoded video frame only immediately prior to display of the decoded video frame;

computer program product displaying the decoded video frame;

computer program product changing the status of the memory buffer from unavailable to available immediately after the displaying thereby rendering the memory buffer available for storing additional video frame data; and computer readable medium for storing the computer code.

14. Computer program product as recited in claim 13, wherein when there are no available memory buffers for storing, then computer program product determining which of the memory buffers includes an earliest display order sequence decoded video frame;

computer program product changing the status of the determined memory buffer from unavailable to available; and computer program product storing a next one of the encoded video frames in the available memory buffer.

15. Computer program product as recited in claim 14, further comprising:

computer program product decoding the stored encoded video frame; and computer program product displaying the decoded video frame.

16. Computer program product as recited in claim 13, further comprising:

computer program product determining if the particular encoded video frame is dependent upon one or more of the encoded video frames when a particular encoded video frame is to be decoded;

recursively determining if the one or more of the encoded video frames is or are dependent upon other encoded video frames when the particular encoded video frame is determined to be dependent upon one or more of the encoded video frames; and computer code for repeating the determining until there are no determined dependent encoded video frames.

17. Computer program product as recited in claim 16, wherein the encoded video stream is an MPEG encoded video stream and wherein the number of encoded video frames includes some I type video frames having no dependency, some P type video frames each of which are dependent upon an immediately preceding I type video frame or an immediately preceding other P type video frame in the forward display mode, and some B type video frames each of which is dependent on at least two reference frames one of which immediately precedes the B type video frame and the other which immediately follows the B type video frame in the forward display mode.

18. Computer program product as recited in claim 17, wherein the encoded video stream is formed of a number of groups of pictures (GOP) each of which includes a number of dependent encoded video frames that are arranged in the display order sequence.

19. Computer program product as recited in claim 18, wherein in the reverse playback mode, a first decoded video frame to be displayed is a last decoded video frame corresponding to one of the encoded video frames included in a particular GOP arranged in the display order sequence.

20. Computer program product as recited in claim 13, wherein the method is performed by a multimedia player unit that includes DVD player unit and a set top box.

\* \* \* \* \*

UNITED STATES PATENT AND TRADEMARK OFFICE
CERTIFICATE OF CORRECTION

PATENT NO. : 7,194,189 B2 Page 1 of 1
APPLICATION NO. : 10/925092
DATED : March 20, 2007
INVENTOR(S) : Matthew D. Halfant It is certified that error appears in the above-identified patent and that said Letters Patent is hereby corrected as shown below:

In Column 16, line 36, change "display" to --displayable--.

In Column 16, line 43, change "the display" to --display--.

In Column 16, line 67, change "encode" to --encoded--.

Signed and Sealed this

Twenty-seventh Day of January, 2009

JOHN DOLL
*Acting Director of the United States Patent and Trademark Office*